United States Patent
Haverkamp et al.

(10) Patent No.: US 11,371,828 B2
(45) Date of Patent: Jun. 28, 2022

(54) COORDINATE MEASURING MACHINE AND METHOD FOR MEASURING COORDINATES OF A WORKPIECE

(71) Applicant: Carl Zeiss Industrielle Messtechnik GmbH, Oberkochen (DE)

(72) Inventors: Nils Haverkamp, Aalen (DE); Dominik Seitz, Schwaebisch-Gemuend (DE); Tanja Teuber, Aalen (DE); Lars Omlor, Pleasanton, CA (US)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 17/243,436

(22) Filed: Apr. 28, 2021

(65) Prior Publication Data
US 2021/0333091 A1    Oct. 28, 2021

(30) Foreign Application Priority Data

Apr. 28, 2020 (DE) ...................... 10 2020 111 509.1

(51) Int. Cl.
*G01B 11/00* (2006.01)
*G01B 11/24* (2006.01)
(Continued)

(52) U.S. Cl.
CPC ............ *G01B 11/005* (2013.01); *G01B 11/24* (2013.01); *G06T 7/337* (2017.01); *G06T 7/74* (2017.01); *G06T 2207/30164* (2013.01)

(58) Field of Classification Search
CPC ......... G01B 11/005; G01B 11/24; G06T 7/74; G06T 7/337; G06T 2207/30164
See application file for complete search history.

(56) References Cited

U.S. PATENT DOCUMENTS 7,358,516 B2    4/2008 Holler et al.
8,326,460 B2 *  12/2012 Ban .................. B25J 9/1697
                                                    700/259
(Continued)

FOREIGN PATENT DOCUMENTS

CN    202599371 U    12/2012
DE    10118392 A1    11/2002
(Continued)

OTHER PUBLICATIONS

Office Action of the German Patent and Trademark Office dated Dec. 16, 2020 (Priority Application No. DE 10 2020 111 509.1) and English-language translation thereof.
(Continued)

*Primary Examiner* — Gregory M Desire
(74) *Attorney, Agent, or Firm* — Falk Ewers; Ewers IP Law PLLC

(57) ABSTRACT

A coordinate measuring machine has a measurement head having a point measurement device which measures first coordinates of only a single point on the surface of a workpiece at a given time. An area measurement device records images of a reference surface. A displacement device displaces the measurement head and/or the workpiece such that they assume different relative positions with respect to one another. An evaluation device calculates a shift between images that the area measurement device has recorded of the reference surface at different times at different relative positions, with a stitching algorithm. Based on this, second coordinates of the measurement head, which are defined relative to the reference surface, are determined. By linking the first coordinates with the second coordinates, third coordinates are determined, which define the points on the surface of the workpiece measured by the point measurement device relative to the reference surface.

9 Claims, 4 Drawing Sheets

(51) Int. Cl.
  *G06T 7/33*    (2017.01)
  *G06T 7/73*    (2017.01)

(56) References Cited

U.S. PATENT DOCUMENTS

| | | | |
|---|---|---|---|
| 9,976,852 B2* | 5/2018 | Kelley | G05B 19/4061 |
| 10,254,404 B2* | 4/2019 | Demirel | G01B 11/25 |
| 10,401,144 B2* | 9/2019 | Pettersson | G01B 11/005 |
| 10,415,955 B2 | 9/2019 | Haverkamp | |
| 10,612,907 B2* | 4/2020 | Christoph | G01B 11/007 |
| 10,706,562 B2 | 7/2020 | Haverkamp et al. | |
| 10,751,883 B2* | 8/2020 | Nahum | B25J 9/1697 |
| 10,757,394 B1* | 8/2020 | Wang | H04N 5/2251 |
| 11,045,918 B2* | 6/2021 | Bock | B23Q 17/2233 |
| 11,059,169 B2* | 7/2021 | Suzuki | B25J 9/1612 |
| 2004/0264758 A1* | 12/2004 | Christoph | G05B 19/40937 |
| | | | 382/141 |
| 2017/0010356 A1 | 1/2017 | Demirel et al. | |
| 2017/0090742 A1* | 3/2017 | Ade | G06T 7/0006 |
| 2017/0304947 A1* | 10/2017 | Shibazaki | B22F 12/00 |
| 2020/0386671 A1 | 12/2020 | Haverkamp | |

FOREIGN PATENT DOCUMENTS

| | | |
|---|---|---|
| DE | 102016124549 A1 | 6/2018 |
| DE | 102019208114 A1 | 12/2020 |
| EP | 3278302 B1 | 7/2019 |

OTHER PUBLICATIONS

Kreutzer, Entwurf, Simulation und Optimierung mehrkamerabasierter 6D-Pose-Messsysteme zur Verringerung der Positionsunsicherheit in der robotergestützten Koordinatenmesstechnik, Gießen, 2016, retrievable at www.core.ac.uk/download/pdf/79463147.pdf and English Language Abstract.

\* cited by examiner

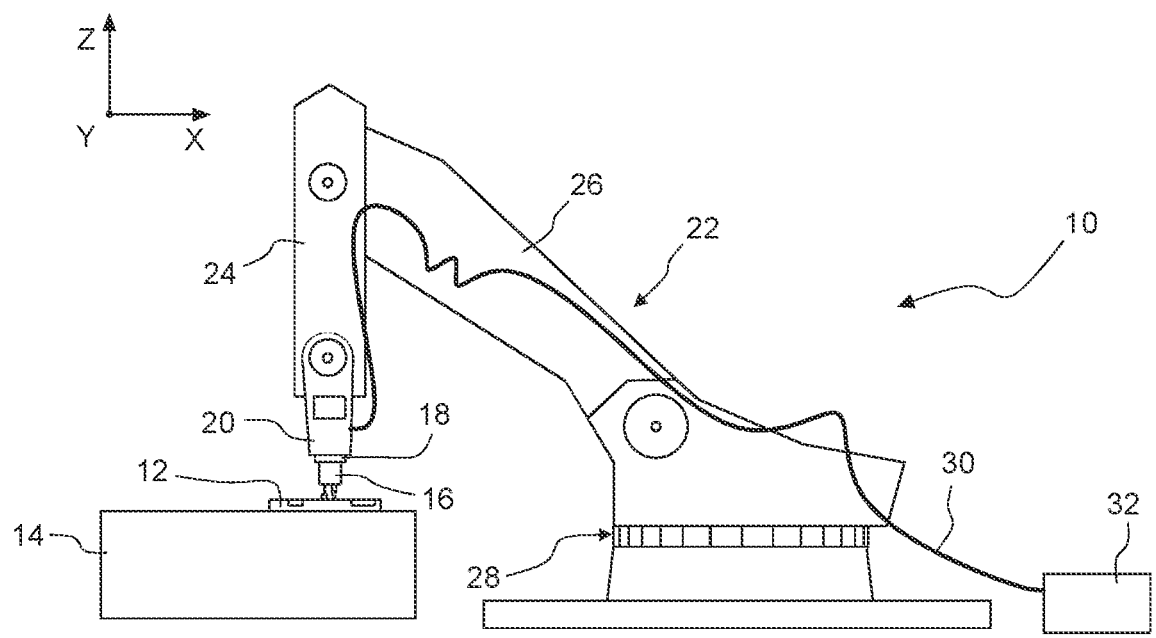
FIG. 1
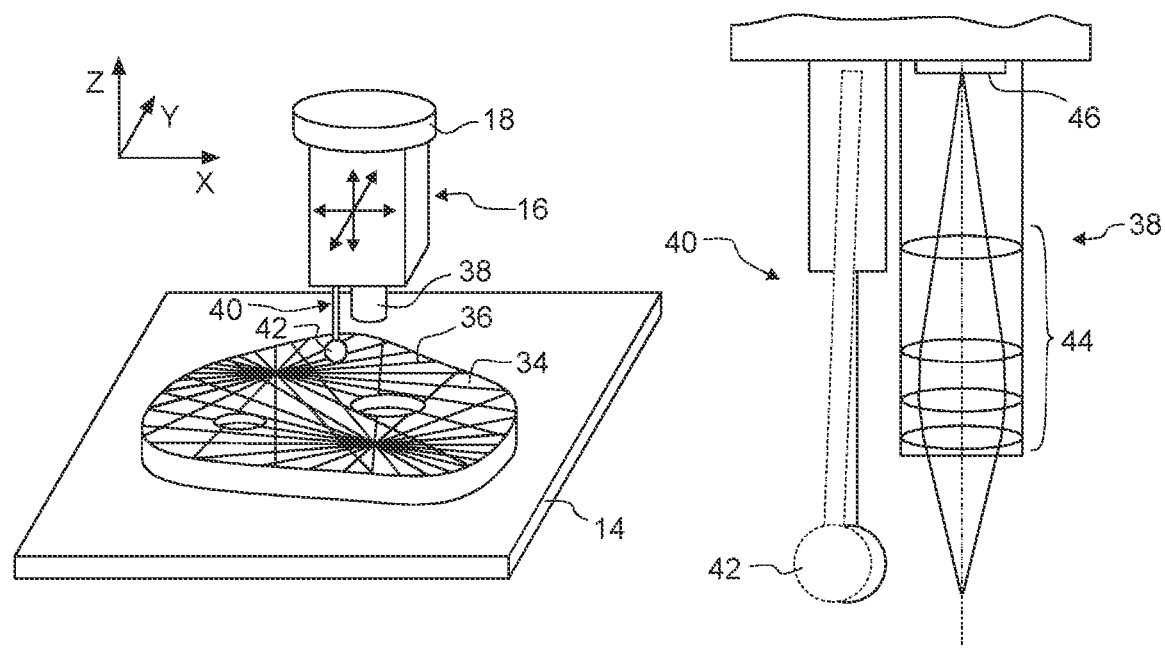
FIG. 2
FIG. 3

COORDINATE MEASURING MACHINE AND METHOD FOR MEASURING COORDINATES OF A WORKPIECE

CROSS REFERENCE TO RELATED APPLICATIONS

This application claims priority to German patent application DE 10 2020 111 509.1, filed Apr. 28, 2020, the entire content of which is incorporated herein by reference.

TECHNICAL FIELD

The disclosure relates generally to a coordinate measuring machine and to a method for measuring coordinates of a workpiece that offers the possibility of a high measurement accuracy yet sets lower requirements in terms of mechanical engineering than conventional machines.

BACKGROUND

For measuring shapes, contours and surfaces of workpieces, coordinate measuring machines are used in the prior art. Such measurements take place, for example, as part of the quality assurance or as part of reverse engineering. The sometimes complex measurement tasks are here generally reduced to the measurement of the spatial coordinates of a plurality of individual points.

The sensors used for measuring coordinates in most cases have only a small measurement region, which is not sufficient for measuring larger workpieces. Coordinate measuring machines therefore include a displacement device, with which the pose (i.e., the position and orientation) of the sensor relative to the workpiece to be measured can be changed. Especially in the case of smaller coordinate measuring machines, the workpiece is frequently located on an X-Y table, which can be displaced along two horizontal coordinate axes x, y with great accuracy. The sensor is attached to a quill, which can be displaced vertically (i.e., in the z-direction) with a similarly high level of accuracy. If larger or particularly heavy workpieces are intended to be measured, coordinate measuring machines having a gantry design are used, in which the workpiece is stationary and merely the sensor is displaced.

The coordinate of a measurement point on the surface of the workpiece in a machine-specific coordinate system in the case of coordinate measuring machines is obtained through vectorial addition of the coordinates of the measurement point in question that the sensor has measured and the coordinates of the pose of the sensor in the machine-specific coordinate system. For this reason, the pose of the sensor must be ascertained with the same accuracy as the coordinates of the measurement point relative to the sensor. For this purpose, at least one length measurement system, which measures the respective position with great accuracy, is assigned to each displacement axis of the displacement device. Typically, incremental length measurement systems with electronic measurement value capturing and with measurement standards on a material basis (for example glass scale) or on an optical basis (for example laser interferometer) are used.

The mechanical complexity for such displacement devices, however, is high, especially in the case of larger measurement volumes. In addition, complicated calibrations and corrective measures are needed if fluctuating ambient conditions and irregular measurement tasks prevent a stable state of equilibrium from being achieved. For this reason, a search has been underway for some time for ways in which the mechanical outlay during coordinate measurements can be reduced.

EP 3 278 302 B1 describes a coordinate measuring machine in which one or more cameras record images of the moving parts of the machine. The relative speed of the parts with respect to one another is ascertained from the smearing of the images due to the movements. The ascertained information can be used, for example, to control the movements of the parts. If the recorded camera image is compared with simulated and/or previously recorded images, the position of the moving part can also be ascertained.

In robot-assisted coordinate measurement technology, the sensor is not carried by a specific and highly precise displacement device but rather by a conventional articulated robot. However, compared to coordinate measuring machines, such robots have a significantly lower positioning accuracy, mainly due to the lower structural and thermal stability and the greater sensitivity to forces and moments that act during movements. However, robots make it easier to position the sensors at hard-to-reach locations, such as in the interior of a vehicle body. Such robot-assisted systems are therefore suitable especially for measurements directly in a production line.

In order to compensate for the lower positioning accuracy of the robots, it has been proposed to photogrammetrically measure the pose of the moving robot hand. In photogrammetry, the spatial position of objects is determined based on recorded measurement images, wherein the imaging behavior of the measurement cameras used is taken into account. To this end, objects having at least three object points (for example LEDs or retroreflectors), whose positions are known, are required. An overview over the known photogrammetric pose sensors can be found in the dissertation by M. Kreutzer, titled Entwurf, Simulation and Optimierung mehrkamerabasierter 6D-Pose-Messsysteme zur Verringerung der Positionsunsicherheit in der robotergestützten Koordinatenmesstechnik, Gießen, 2016, retrievable at www.core.ac.uk/download/pdf/79463147.pdf.

However, not even with these systems is it possible to attain the measurement accuracies as are known from coordinate measuring machines.

SUMMARY

It is therefore an object of the disclosure to provide a coordinate measuring machine and a method for measuring coordinates of a workpiece that offers the possibility of a high measurement accuracy yet sets lower requirements in terms of mechanical engineering than conventional machines.

For the coordinate measuring machine, this object is achieved by a coordinate measuring machine having a measurement head that has a point measurement device configured for measuring first coordinates of only a single point on the surface of a workpiece at a given time. The first coordinates are defined here in relation to the measurement head. The measurement head additionally has an area measurement device that is rigidly connected to the point measurement device and is configured for recording images of a reference surface. The reference surface in this case is the surface of the workpiece or a surface of a component whose position relative to the workpiece is unchangeable. The coordinate measuring machine additionally includes a displacement device, which is configured to displace the measurement head and/or the workpiece such that they assume different relative positions with respect to each other.

An evaluation device is configured to calculate a shift between images that the area measurement device has recorded of the reference surface at different times at different relative positions by using a stitching algorithm, and for determining, based on the calculated shift, second coordinates of the measurement head that are defined relative to the reference surface. By linking the first coordinates with the second coordinates, third coordinates are determined by the evaluation device, which define the points on the surface of the workpiece measured by the point measurement device relative to the reference surface.

Rather than establishing the measurement correlation between the point measurement device and a measurement standard over the translational and possibly rotational degrees of freedom of the displacement device, the disclosure is based on the idea of using a camera or another area measurement device for this that determines relative movements between the point measurement device and the workpiece by correlating the images that were recorded at different relative positions. To this end, the coordinate measuring machine uses a stitching algorithm, as is used analogously when stitching photos to produce a panoramic image. All that is required for the stitching is that partially identical image contents are found on the images that are to be compared. The algorithms then shift the images such that the matching image contents lie completely on top of one another. The resulting shift allows the route the area measurement device (and the point measurement device that is rigidly connected thereto) have traveled between the recorded images to be determined.

By using area measurement devices having a very high resolution and stitching algorithms that are known per se, it is possible in this manner to accurately calculate the shift to about 50 nm. This lies in the order of the measurement accuracy as is achieved by conventional coordinate measuring machines with mechanically complicated displacement devices.

The disclosure thus makes it possible to dispense with the mechanically highly complex displacement devices of conventional coordinate measuring machines. Of course, it is also possible for a measurement head according to an aspect of the disclosure to be attached to a coordinate measuring machine, which may have a cantilever design, a bridge design, a gantry design, or a horizontal arm design. However, the mechanical requirements regarding these displacement devices are then significantly lower. If a measurement head according to an aspect of the disclosure is used together with a conventional highly precise displacement device, at least the outlay for complicated calibrations and correction calculations can be completely or partially dispensed with.

Since the coordinate measuring machine according to an aspect of the disclosure does not require a highly precise displacement device, it is also possible for an articulated robot to be used as the displacement device. This simplifies the use of coordinate measuring machines according to an aspect of the disclosure in production lines for performing in-line measurements.

As has already been mentioned, the area measurement device is typically a high-resolution camera. 3D measurement devices, which provide height information in addition to the area information, can also be used. When measuring three-dimensional workpieces, the use of an additional distance measurement device, which is integrated in the measurement head and measures the distance between the measurement head and a typically planar reference surface whose position relative to the workpiece is unchangeable, can then be dispensed with. A 3D measurement device that is suitable in principle is described for example in DE 10 2019 208 114 A1.

The component of which the area measurement device records images can also be a replica of the workpiece. This automatically ensures that for every point on the workpiece captured by the point measurement device, an area element of which a sufficiently large image can be recorded is available for the area measurement device. Such a replica can also be advantageous in the case of three-dimensional workpieces because the distance between the area sensor and the reference surface can in this way be kept approximately constant. This is advantageous in view of high-quality optical imaging, which in turn is required for an accurate shift determination with the aid of stitching algorithms. All that is important for the replica is that its surface is provided with features or structures that reliably allow stitching. It is, however, not necessary to approximate the workpiece that is to be measured as best as possible. In this way, the replica can be produced for example by way of an inexpensive rapid prototyping method.

In order to further reduce the outlay for providing a replica, the latter can also be variably assembled in modular fashion from a plurality of components. This is expedient especially for workpieces having a geometrically simple design.

The component carrying the reference surface can also be a carrying table for the workpiece, said carrying table having a surface that is at least partially provided with a structure that is capturable by the area measurement device. This structure itself then represents a measurement standard used for orientation purposes by the shift measurement that is the basis for the shift measurement.

Ideally, the reference surface should be provided with a structure that is designed such that the images of the structure recorded by the area measurement device always differ from one another. This prevents identical images being recorded at different relative positions between the workpiece and the measurement head, and the evaluation device therefore from erroneously assuming that there is no shift. However, identical structures can be tolerated if they are located at large enough distances from one another and the image frequency is sufficiently high, since in that case no ambiguities can occur over short distances.

With respect to the method, the above-mentioned object is achieved by a method having the following steps:

a) measuring first coordinates of a single point on the surface of a workpiece with a point measurement device, which is arranged in a measurement head of a coordinate measuring machine, wherein the first coordinates are defined relative to the measurement head;

b) recording an image of a reference surface, which is either the surface of the workpiece or a surface of a component whose position relative to the workpiece is unchangeable, with an area measurement device, which is rigidly connected to the point measurement device;

c) displacing the measurement head and/or the workpiece such that they assume different relative positions with respect to one another;

d) repeating steps a) and b);

e) calculating a shift between images that the area measurement device has recorded of the reference surface before and after step c) at different relative positions, with a stitching algorithm;

f) determining second coordinates of the measurement head, which are defined relative to the reference surface, from the shift calculated in step e); and g) determining third coordinates by linking the first coordinates with the second coordinates, wherein the third coordinates define the points on the surface of the workpiece, which were measured by the point measurement device, relative to the reference surface.

The considerations and advantageous configurations discussed above regarding the coordinate measuring machine correspondingly apply to the method.

The shift calculation according to an aspect of the disclosure with the aid of a stitching algorithm for the purpose of determining the position of the measurement head is utilizable advantageously not only for coordinate measuring machines, but also for processing machines. The measurement head in that case is rigidly coupled to a processing head, which may include for example a processing laser or a machining tool, or may comprise it. In this way, the processing/measurement head can assume a relative position with respect to the workpiece that can be set very precisely, as is occasionally necessary for precision processing.

BRIEF DESCRIPTION OF THE DRAWINGS

The disclosure will now be described with reference to the drawings wherein:

FIG. 1 shows a schematic side view of a coordinate measuring machine according to a first exemplary embodiment;

FIG. 2 shows a perspective view of a measurement head of the exemplary embodiment shown in FIG. 1 during the measurement of a workpiece;

FIG. 3 shows a schematic longitudinal section through the measurement head shown in FIG. 2;

DESCRIPTION OF EXEMPLARY EMBODIMENTS

First Exemplary Embodiment

Figure 4:
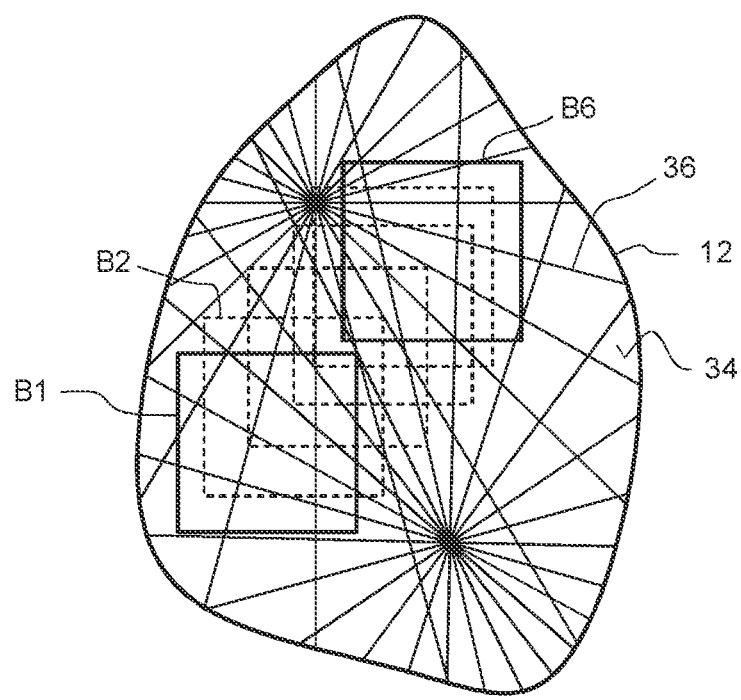
FIG. 4 shows a plan view of a pattern on the surface of the workpiece to be measured.

FIG. 1 shows a schematic side view of a coordinate measuring machine, designated 10 overall, according to a first exemplary embodiment of the disclosure. The measurement task is to measure shape deviations of a workpiece 12, which is carried by a carrying table 14.

The coordinate measuring machine 10 for this purpose has a measurement head 16, which is attached to a robot hand 20 of an articulated robot 22 by way of a coupling flange 18. The robot hand 20 is attached, in a manner which is not illustrated in more detail, to an arm 24 so as to be rotatable about three orthogonal axes. The arm 24 for its part is connected in an articulated manner to a swing arm 26, which is fixed to a carousel 28 for rotation. The 6-axis articulated robot 22 serves as a displacement device with which the measurement head 16 can be displaced relative to the stationary workpiece 12.

Depending on the measurement task, displacement devices having a simpler design can also be used. However, the measurement head 16 can also be attached to a displacement device of a conventional coordinate measuring machine having a gantry, cantilever or bridge design. However, only low requirements regarding the positioning accuracy apply to the displacement device, since the measurement head 16 determines position changes relative to the workpiece 12 itself with great accuracy, in a manner that will be discussed in more detail below.

The measurement head 16 is connected to an evaluation device 32 of the coordinate measuring machine 10 by way of a data cable 30.

FIG. 2 shows the measurement head 16 and the workpiece 12 in a schematic perspective illustration. In this exemplary embodiment, the workpiece 12 has on its surface 34 facing the measurement head 16 an irregular pattern 36, which can be printed for example with the aid of an inkjet printer or can be drawn on by hand using a felt tip pen. If the surface 34 itself is clearly structured due to the production process or its shape, provision of the pattern 36 afterward can be dispensed with. The pattern 36 merely has to have the property of being able to be captured by a camera 38 that is integrated in the measurement head 16. The pattern 36 should be irregular so that images recorded by the camera 38 at different positions differ from one another.

Additionally, a point measurement device, which in the exemplary embodiment illustrated is designed as a measuring tactile sensor 40 in which the deflection of a probe ball 42 is measured, as is known per se in the prior art, is integrated in the measurement head 16.

The longitudinal section of FIG. 3 schematically illustrates the deflection of the probe ball 42. The setup of the camera 38 with an imaging optical unit 44 and an image recorder 46 is additionally indicated. The requirements regarding the image quality of the camera 38 and the resolution of the image recorder 46 are high because the movements of the measurement head 16 relative to the stationary workpiece 12 are determined by using the images recorded by the camera 38. For great measurement accuracy it is important for the camera 38 to be connected as rigidly as possible to the tactile sensor 40. Only then is it possible for the pose of the tactile sensor 40 to be derived directly from the pose of the camera 38.

This will be explained in more detail below with reference to FIGS. 4, 5A, 5B, and 6. FIG. 4 shows a plan view of the surface 34 of the workpiece 12 with the pattern 36. When the measurement head 16 is guided over the surface 34 of the workpiece 12 by the articulated robot 22 during a measurement, the camera 38 gradually scans across the surface 34. In the process, it records a plurality of images, of which only six images, designated with B1 to B6, are indicated in FIG. 4 between a starting position and an end position.

Figure 5A:
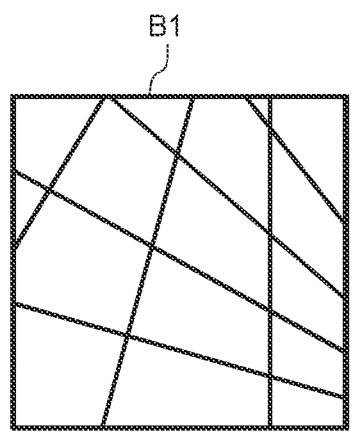
FIGS. 5A and 5B show images of the pattern, which were recorded by the camera of the measurement head at different positions.
Figure 5B:
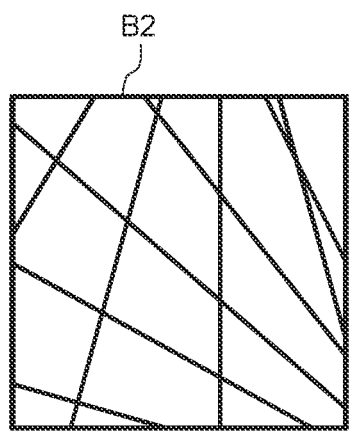
Figure 6:
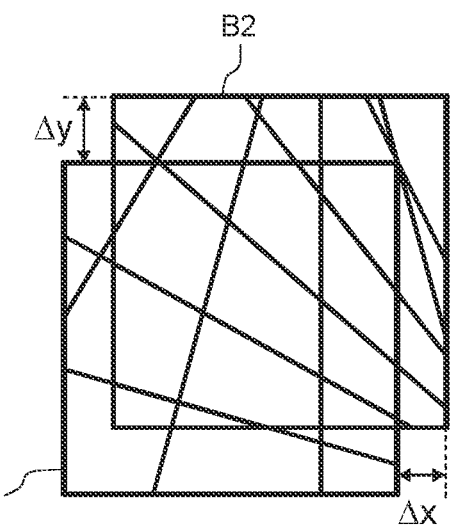
FIG. 6 shows the computational overlay of the images recorded in FIGS. 5A and 5B for determining the shift along the x- and y-directions.

FIGS. 5A and 5B show an enlarged illustration of the images B1 and B2. As can be seen in FIG. 4, the images B1 and B2 partially overlap, which is why the illustrated image contents partially match. The images B1 to B6 recorded by the camera 38 are supplied to the evaluation device 32 via the data cable 30 and processed there by a stitching algorithm that is known per se. The latter computationally displaces the images B1, B2 such that the matching image contents coincide completely, as shown in FIG. 6. The images B1, B2 are shifted here relative to one another by Δx and Δy along the x- and the y-direction. The evaluation device 32 can determine, from the shift Δx and Δy calculated by the stitching algorithm, the coordinates that the camera has relative to the surface 34 after the dis-placement of the measurement head 16 to the position at which the second image B2 was recorded. The shift calculation thus does not provide absolute position data for the camera 38, but merely relative coordinates that define the position of the camera 38 relative to the surface 34 of the workpiece 12 and represent position changes.

When using a high-resolution camera 38 with a powerful imaging optical unit 44 and powerful stitching algorithms, the shift Δx and Δy between the images B1, B2 can be calculated very precisely with accuracies of up to around 50 nm.

Since the tactile sensor 40 is rigidly connected to the camera 38, the calculated position changes for the camera 38 automatically also provide the position changes for the tactile sensor 40 and the entire measurement head 16.

During the measurement of the workpiece 12, the measurement head 16 is guided over the workpiece 12 according to a prescribed path with the articulated robot 22 in a manner such that the tactile sensor 40 can measure the coordinates of points on the workpiece 12 by contact-probing at a plurality of positions. With each contact-probing operation, the camera 38 records an image of the pattern 36 on the surface 34 of the workpiece 12. The change in the position of the tactile sensor 40 relative to the position at which the last contact-probing was carried out corresponds, as discussed above, to the shift Δx and Δy calculated by the evaluation device 32. The evaluation device 32 links first coordinates, which were measured by the tactile sensor 40 and are defined relative to the measurement head 16, with the second coordinates, which were measured by the camera 38 and are defined relative to the surface 34 of the workpiece 12. The linking (generally a simple vector addition) produces third coordinates, which define the points measured by the tactile sensor 40 on the surface of the workpiece 12 relative to the surface 34.

The above-described method therefore does not allow calculation of coordinates in a coordinate system of the coordinate measuring machine 10. It is therefore also not possible to set a starting position of the measurement head 16 for the first contact-probing with great precision because the articulated robot 22 achieves only a comparatively low position accuracy. However, this is not a problem regarding the measurement of the workpiece 12, because the aim of the measurement is merely the measurement of coordinates that are defined relative to the workpiece 12. This is sufficient for the measurement tasks to be performed, namely the measurement of shape deviations of the workpiece 12.

2. Second Exemplary Embodiment

The measurement axis of the tactile sensor 40 and the optical axis of the camera 38 are necessarily located at a distance from one another in the lateral direction. Workpieces smaller than this lateral distance can be measured only with difficulty, since the optical axis of the camera 38 in that case does not pass through the workpiece 12.

Similar problems occur when the tactile sensor 40 in the arrangement shown in FIG. 2 is located near the edge of the workpiece 12. In that case, the workpiece 12 possibly does not completely fill the image field of the camera 38. The fewer items of image information available, the lower the accuracy generally is with which the stitching algorithm can calculate the shift Δx and Δy.

Figure 7:
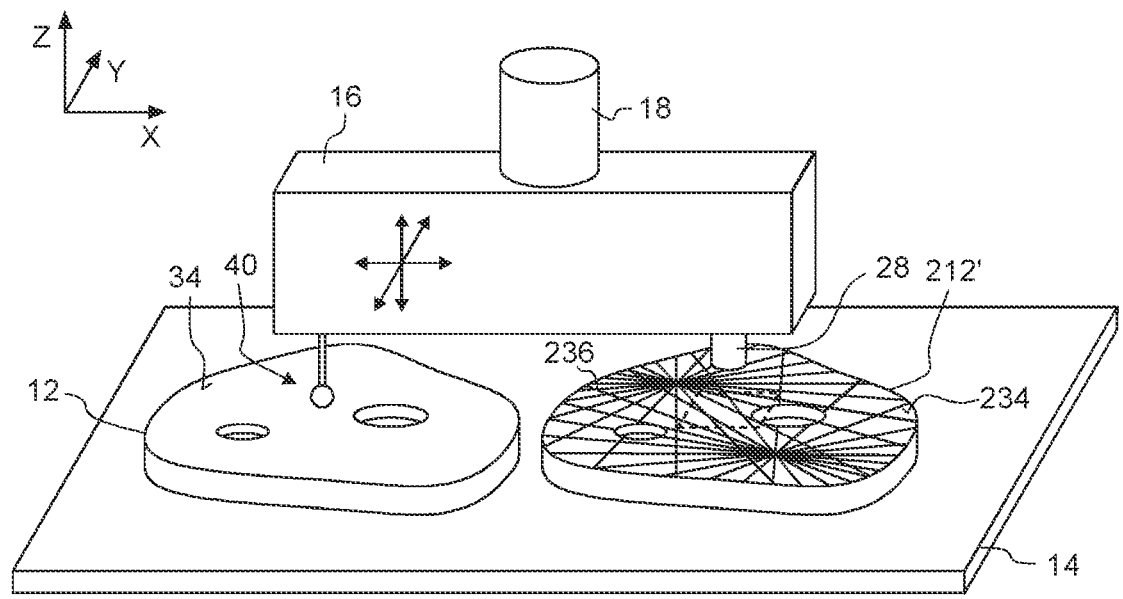
FIG. 7 shows an illustration (based on FIG. 2) of a measurement head according to a second exemplary embodiment, in which the camera records images of a replica of the workpiece.

In the exemplary embodiment shown in FIG. 7, the lateral distance between the tactile sensor 40 and the camera 38 in the measurement head 16 is therefore significantly enlarged. This offers the possibility that the camera 38 does not scan over the surface 34 of the workpiece 12 during the measurement operation, but rather over the surface 234 of a replica 212' of the workpiece 12. The replica 212' is in this case typically located at the same lateral distance from the workpiece 12 as the tactile sensor 40 is from the camera 38. Consequently, the lateral distance between the tactile sensor 40 and the camera 38 no longer results in a reduction of the size of the image field.

The replica 212' merely needs to resemble the workpiece 12 in terms of its rough dimensions. The dimensional accuracy of the replica 212' is not critical because the measurement accuracy depends only on the images that are recorded of the surface 234 of the replica 212'. The replica 212' can be produced, for example, by a rapid prototyping method. The surfaces that are produced in the process are generally so rough that no additional pattern needs to be created by printing, painting, or machining.

Compared to the above-described first exemplary embodiment, the use of a replica 212' additionally has the advantage that the surface 34 of the workpiece 12 does not have to be provided with a pattern 36 that is identifiable for the camera 38. In this way, even extremely smooth or reflective workpiece surfaces can be measured without having to be painted or printed before the measurement and subsequently cleaned again.

3. Third Exemplary Embodiment

Figure 8:
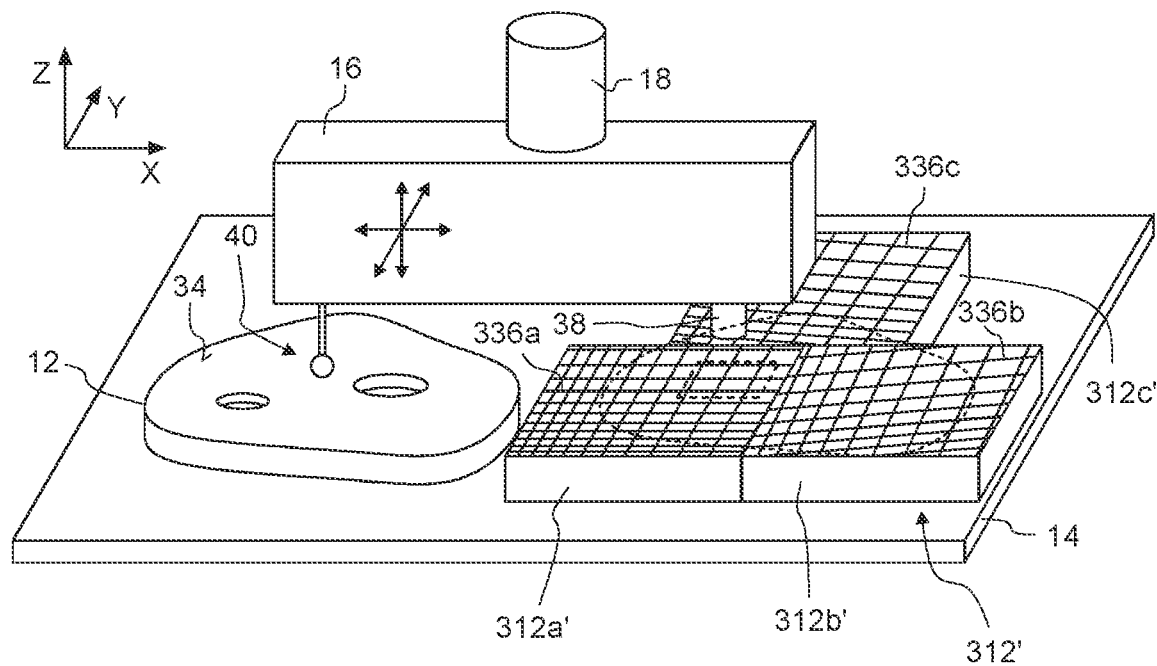
FIG. 8 shows an illustration (based on FIG. 2) of a measurement head according to a third exemplary embodiment, in which the replica is assembled in modular fashion from a plurality of components.

In the exemplary embodiment shown in FIG. 8, the camera 38 does not record images of a replica that was produced specifically for the workpiece 12. Rather, a replica 312', which was assembled from a plurality of simple components 312a', 312b', and 312c', is used. The components 312a', 312b', and 312c' are cuboid here and are provided on their surfaces facing the measurement head 16 with different patterns 336a, 336b, and 336c, respectively. It is necessary to assemble so many components 312a', 312b', and 312c' until a sufficiently large contiguous surface is produced that can be covered by the camera 38 during the measurement operation.

4. Fourth Exemplary Embodiment

In the above-described exemplary embodiments, it was assumed that the surface 34 of the workpiece 12 facing the measurement head 16 is two-dimensional, that is to say has only a slight height profile. The measurement head 16 therefore needs to be displaced only in a plane that is parallel to the surface 34, that is to say along the x- and the y-direction. If the measurement head 16 is intended to move during the measurement in the vertical z-direction as well, for example to be able to probe the circumferential edge of the workpiece 12 with the aid of the tactile sensor 40, the height change must be ascertained by a separate measurement system, since the stitching algorithm can be used only to calculate relative coordinates in the x- and y-directions.

Figure 9:
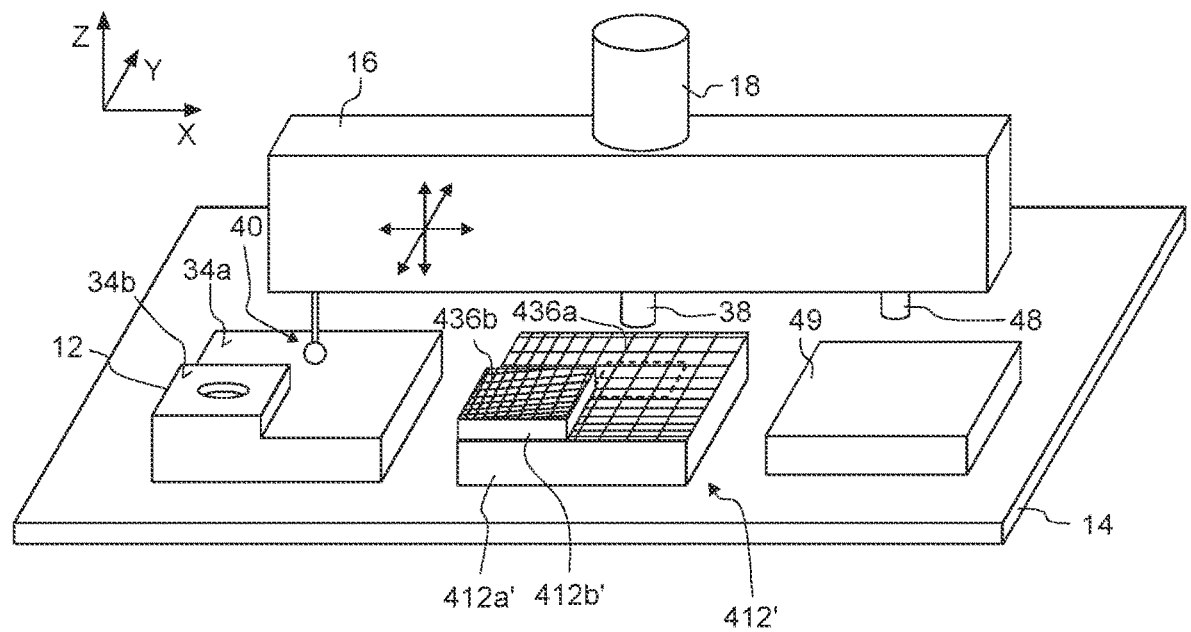
FIG. 9 shows an illustration (based on FIG. 2) of a measurement head according to a fourth exemplary embodiment, in which an additional distance measurement device measures the distance between the measurement head and a planar reference surface.

The measurement head 16 shown in FIG. 9 for this purpose has an additional distance measurement device 48, which for example can be configured as a chromatic confocal sensor and measures the distance of the measurement head 16 from a further reference surface. The latter in the exemplary embodiment illustrated here is the planar surface of a cuboid 49, which is attached to the carrying table 14 and whose position relative to the workpiece 12 is unchangeable. Alternatively, it is also possible, for example, to measure the distance from the planar surface of the carrying table 14. The distance from a non-planar reference surface can also be measured in principle, but in that case the height profile of the reference surface must be known exactly. Using the distance measurement device 48, position changes along the z-direction can be captured and assigned to the position changes, provided by the stitching algorithm, in the x-direction and the y-direction.

For a highly precise position measurement in the x- and y-directions, the camera 38 requires a high lateral resolution. This entails a relatively small depth of field, with the result that the patterns 336a, 336b, and 336c in the exemplary embodiment shown in FIG. 8 may no longer be able to be imaged sharply when the measurement head 16 travels relatively large distances in the z-direction.

To avoid blurring, a replica 412' consisting of two components 412a', 412b', which are arranged one above the other and each having surfaces with different patterns, is used in the exemplary embodiment shown in FIG. 9. If the section 34b of the surface of the workpiece 12, which is disposed at a greater height than the section 34a, is to be measured by the tactile sensor 40, the measurement head 16 is lifted accordingly, and the camera 38 subsequently records images of the elevated surface of the component 412b' from this elevated position. In this way, the surface of the replica 412' lies in the focal plane of the camera 38 even after the measurement head 16 is lifted.

5. Fifth Exemplary Embodiment

Figure 10:
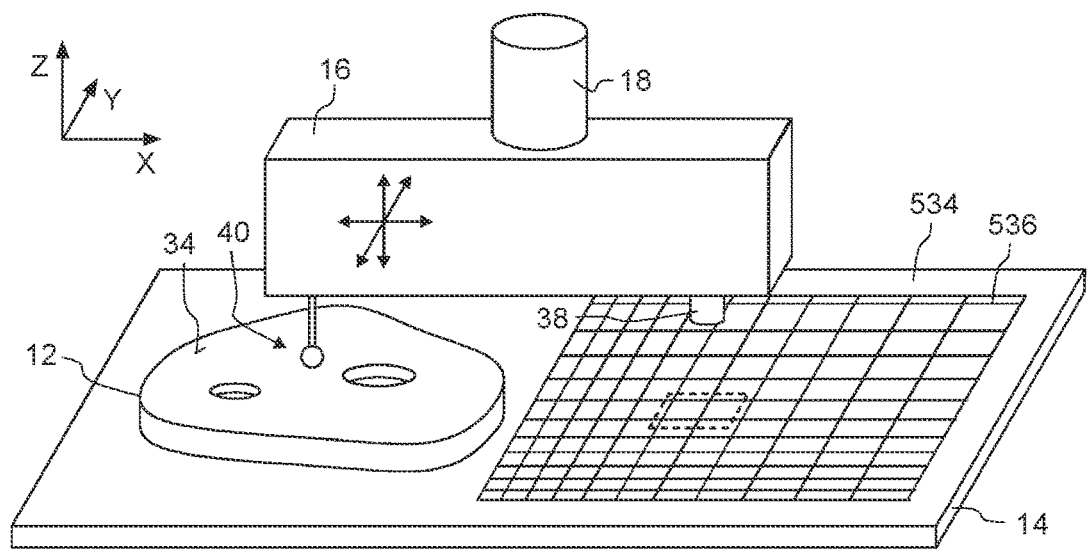
FIG. 10 shows an illustration (based on FIG. 2) of a measurement head according to a fifth exemplary embodiment, in which a carrying table for the workpiece is provided with a structure that is recorded by the camera of the measurement head.

In the exemplary embodiment shown in FIG. 10, the camera 38 does not record images of the workpiece 12 or of a replica of the workpiece, but of a section of the surface 534 of the carrying table 14 on which the workpiece 12 lies. This section 534 is provided with a pattern 536, which serves as a measurement standard. As long as the position of the carrying table 14 within the coordinate measuring machine 10 is known exactly, coordinates of the workpiece 12, which are defined in a coordinate system associated with the coordinate measuring machine 10, can be determined in this way.

The construction shown in FIG. 10 is particularly simple, but allows merely the measurement of two-dimensional workpieces 12, which additionally should always have the same thickness, since the measurement head 16 should be moved over the surface 534 of the carrying table 14 if possible at a fixed distance prescribed by the imaging optical unit 44. The use of zoom optical units may pose a problem for the highly precise shift calculation because of the imaging aberrations that occur in that case.

It is understood that the foregoing description is that of the exemplary embodiments of the disclosure and that various changes and modifications may be made thereto without departing from the spirit and scope of the disclosure as defined in the appended claims.

What is claimed is:

1. A coordinate measuring machine comprising:
  a measurement head comprising:
    a point measurement device configured to measure first coordinates of only a single point on a surface of a workpiece at a given time, wherein the first coordinates are defined relative to the measurement head;
    an area measurement device rigidly connected to the point measurement device and configured for recording images of a reference surface, where in wherein the reference surface is the surface of the workpiece or the surface of a component whose position relative to the workpiece is unchangeable;
  a displacement device configured to displace the measurement head and/or the workpiece such that the measurement head and/or the workpiece assume different relative positions with respect to each other; and
  an evaluation device configured to:
    calculate a shift between the images that the area measurement device has recorded of the reference surface at different times at different relative positions with a stitching algorithm, and determine, based on the calculated shift, second coordinates of the measurement head that are defined relative to the reference surface, and
    determine, by linking the first coordinates with the second coordinates, third coordinates, which define points on the surface of the workpiece measured by the point measurement device relative to the reference surface.

2. The coordinate measuring machine as claimed in claim 1, wherein the component is a replica of the workpiece.

3. The coordinate measuring machine as claimed in claim 2, wherein the replica is produced by a rapid prototyping method.

4. The coordinate measuring machine as claimed in claim 2, wherein the replica is assembled in a modular fashion from a plurality of components.

5. The coordinate measuring machine as claimed in claim 1, wherein the component is a carrying table for the workpiece, said carrying table having a surface that is at least partially provided with a structure that is capturable by the area measurement device.

6. The coordinate measuring machine as claimed in claim 1, wherein the measurement head has a distance measurement device configured to measure a distance between the measurement head and a further reference surface whose position relative to the workpiece is unchangeable.

7. The coordinate measuring machine as claimed in claim 1, wherein the reference surface is provided with a structure configured such that the images of the structure recorded by the area measurement device always differ from one another.

8. The coordinate measuring machine as claimed in claim 1, wherein the displacement device comprises an articulated robot.

9. A method for measuring coordinates of a workpiece, the method comprising the steps of:
  (a) measuring first coordinates of a single point on a surface of the workpiece with a point measurement device arranged in a measurement head of a coordinate measuring machine, wherein the first coordinates are defined relative to the measurement head;
  (b) recording an image of a reference surface, wherein the reference surface is the surface of the workpiece or the surface of a component, whose position relative to the workpiece is unchangeable, with an area measurement device that is rigidly connected to the point measurement device;
(c) displacing the measurement head and/or the workpiece such that the measurement head and/or the workpiece assume different relative positions with respect to one another;
(d) repeating steps (a) and (b);
(e) calculating a shift between images that the area measurement device has recorded of the reference surface before and after step (c) at different relative positions, with a stitching algorithm;
(f) determining second coordinates of the measurement head, which are defined relative to the reference surface, from the shift calculated in step (e); and
(g) determining third coordinates by linking the first coordinates with the second coordinates, wherein the third coordinates define points on the surface of the workpiece, which were measured by the point measurement device, relative to the reference surface.

* * * * *